United States Patent
Khosa et al.

(10) Patent No.: US 9,607,351 B2
(45) Date of Patent: Mar. 28, 2017

(54) SYSTEMS AND METHODS FOR GPU VIRTUALIZATION

(71) Applicant: General Dynamics C4 Systems, Inc., Scottsdale, AZ (US)

(72) Inventors: Shivani Khosa, Sydney (AU); Philip Geoffrey Derrin, Carlingford (AU); Carl Van Schaik, Kingsford (AU); Daniel Paul Potts, Botany (AU)

(73) Assignee: GENERAL DYNAMICS MISSION SYSTEMS, INC., Fairfax, VA (US)

( * ) Notice: Subject to any disclaimer, the term of this patent is extended or adjusted under 35 U.S.C. 154(b) by 269 days.

(21) Appl. No.: 14/155,632

(22) Filed: Jan. 15, 2014

(65) Prior Publication Data

US 2015/0029200 A1    Jan. 29, 2015

Related U.S. Application Data

(60) Provisional application No. 61/858,071, filed on Jul. 24, 2013.

(51) Int. Cl.
  *G06T 1/20*        (2006.01)
  *G06F 9/00*        (2006.01)
  *G06F 9/455*       (2006.01)

(52) U.S. Cl.
  CPC .............. *G06T 1/20* (2013.01); *G06F 9/00* (2013.01); *G06F 9/45558* (2013.01); *G06F 2009/45579* (2013.01)

(58) Field of Classification Search
  CPC ..... G06T 1/20; G06F 3/1206; G06F 9/45558; G06K 9/18
  See application file for complete search history.

(56) References Cited

U.S. PATENT DOCUMENTS

| | | | |
|---|---|---|---|
| 7,528,838 B2 * | 5/2009 | Gosalia et al. ............... 345/538 |
| 2008/0007559 A1 * | 1/2008 | Kalaiah .............. H04N 13/0275 |
| | | | 345/501 |
| 2008/0198168 A1 * | 8/2008 | Jiao ....................... G06T 15/005 |
| | | | 345/506 |
| 2011/0102443 A1 * | 5/2011 | Dror et al. .................... 345/522 |
| 2011/0144970 A1 * | 6/2011 | Jiang et al. ..................... 703/24 |
| 2013/0155083 A1 * | 6/2013 | McKenzie et al. ........... 345/522 |

* cited by examiner

*Primary Examiner* — Maurice L McDowell, Jr.
(74) *Attorney, Agent, or Firm* — Lorenz & Kopf, LLP

(57) ABSTRACT

A method is provided for sharing access to graphics processing unit (GPU) hardware between multiple client virtual machines, wherein each of the client virtual machines has a high-level application programming interface (API) associated therewith for communicating with the GPU hardware. The method includes virtualizing the GPU by intercepting GPU-specific commands from the plurality of client virtual machines, wherein the commands specific to the GPU are at a lower level than that of the high-level API, and providing the intercepted commands to the GPU hardware.

17 Claims, 6 Drawing Sheets

SYSTEMS AND METHODS FOR GPU VIRTUALIZATION

CROSS-REFERENCE TO RELATED APPLICATIONS

This application claims priority to U.S. Prov. Pat. App. No. 61/858,071, filed Jul. 24, 2013, the contents of which are hereby incorporated by reference.

TECHNICAL FIELD

The technical field generally relates to computing systems, and more particularly relates to graphics processing units (GPUs) used in connection with such systems.

BACKGROUND

GPUs are widely used to accelerate the processing of 2D and 3D graphics by offloading the computing-intensive routines from the central processing unit (CPU), thereby greatly improving graphics performance in computing systems. Since GPUs vary greatly in their architectures and command-sets, high level APIs have been designed to provide a common language for developing applications that take advantage of the GPU's capabilities without having to know the details of the specific GPU. Examples of such languages include OpenGL, OpenCL, Direct3D, and OpenVG.

Virtualization of a GPU device is useful to allow multiple independent environments shared access to the GPU hardware device. For example, in the context of desktop virtualization, Windows and Linux virtual machines (VMs) may be concurrently running on a computer, each with applications requiring GPU acceleration. In another example, an application running on a remote access server may wish to use the GPU of the client computer that is providing the user interface (UI).

Virtualization of the GPU is most commonly implemented by intercepting an application's use of high level (e.g., OpenGL) APIs and forwarding the operations to another environment (VM or another machine) containing access to the GPU, where the high level API is translated into the GPU specific commands. For example, in a remote desktop environment, the application (running on the server) has its use of OpenGL commands intercepted (E.g. by an implementation of the OpenGL library) and forwarded to the client machine where the OpenGL commands are injected into the client's native OpenGL library and rendered to the client's display.

GPU virtualization may also be implemented in a standalone manner without any display hardware. Many GPU devices are memory-to-memory devices, and do not depend on a physical display. The GPU takes input commands and textures from memory, and composes an output scene into memory. In some implementations of GPU virtualization, the output scene in memory is then redirected to a remote display using an unrelated technique, such as sending frames as compressed images over a network. In other implementations, the GPU may be used as a general purpose processor for accelerating computation intensive workloads, especially highly parallelizable non-graphical computation such as scientific simulations and bioinformatics.

A hardware approach to GPU virtualization generally includes designing the GPU device itself to support virtualization. Typically this means that the GPU hardware supports multiple independent GPU software stacks communicating with it concurrently. The GPU is required to keep track of each GPU software stack context (e.g. one per guest OS) and perform its own scheduling of commands from the different guests. This approach is limited by the GPU hardware, which often has no virtualization support, or only a limited number of contexts.

Another approach to GPU virtualization involves time-sharing the use of the GPU hardware itself through a process mediated by a Hypervisor, and supported by a specially modified version of the vendor's graphics software stack. In this approach, each VM has access to the GPU hardware for a certain period of time, and directly controls the GPU hardware during this time. This and each of the preceding virtualization techniques are undesirable in various respects.

Accordingly, it is desirable to provide improved methods and systems for GPU virtualization. Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

DETAILED DESCRIPTION

In general, systems and methods are provided for allowing multiple environments (e.g., devices, operating systems, client virtual machines etc.) to share the use of a single graphics processing unit (GPU) without direct access to the GPU hardware. In accordance with one embodiment, GPU virtualization is performed at a high level (using, for example, OpenGL level virtualization) or the next level down (e.g., the vendor specific GPU interface at the kernel/user API). Performing the split at the kernel/user API level does not require any changes to the proprietary user-space graphics libraries, and has the advantage of being more robust, secure, flexible and simple. In accordance with another aspect, a driver virtualization technique is provided that links a VM's swap chain with its virtual framebuffer, as described in further detail below.

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group)

and memory that executes one or more software or firmware programs, a combinational logic circuit, and/or other suitable components that provide the described functionality.

In general, the embodiments disclosed herein take a unique approach to GPU virtualization that relies on a specific GPU software stack architecture. The required architecture is one in which a proprietary vendor library performs the translation of high level language (e.g. OpenGL) to low level GPU specific language in software on the CPU, and this translation is performed separately from the GPU driver which communicates with the GPU hardware. The invention involves the interception of these translated (GPU type specific) commands and the forwarding of these commands to another environment for injection into the GPU driver.

Figure 1:
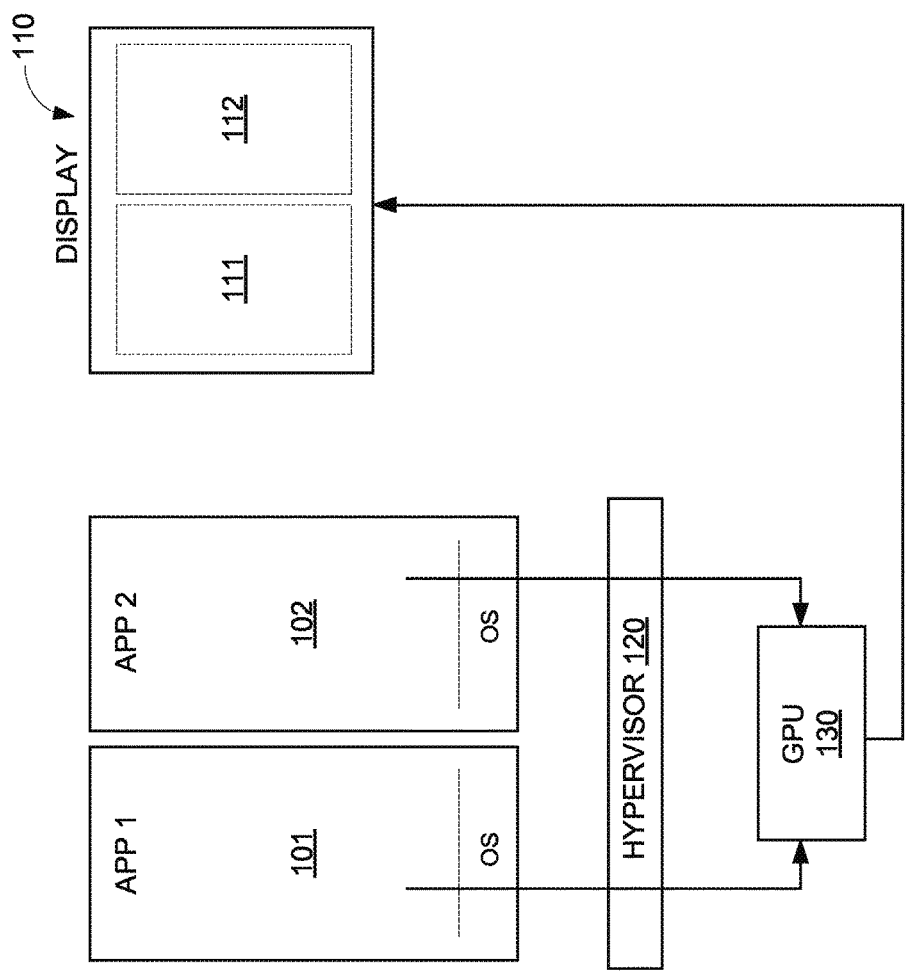
FIG. 1 is a simplified, functional block diagram of an example GPU sharing system.
Figure 2:
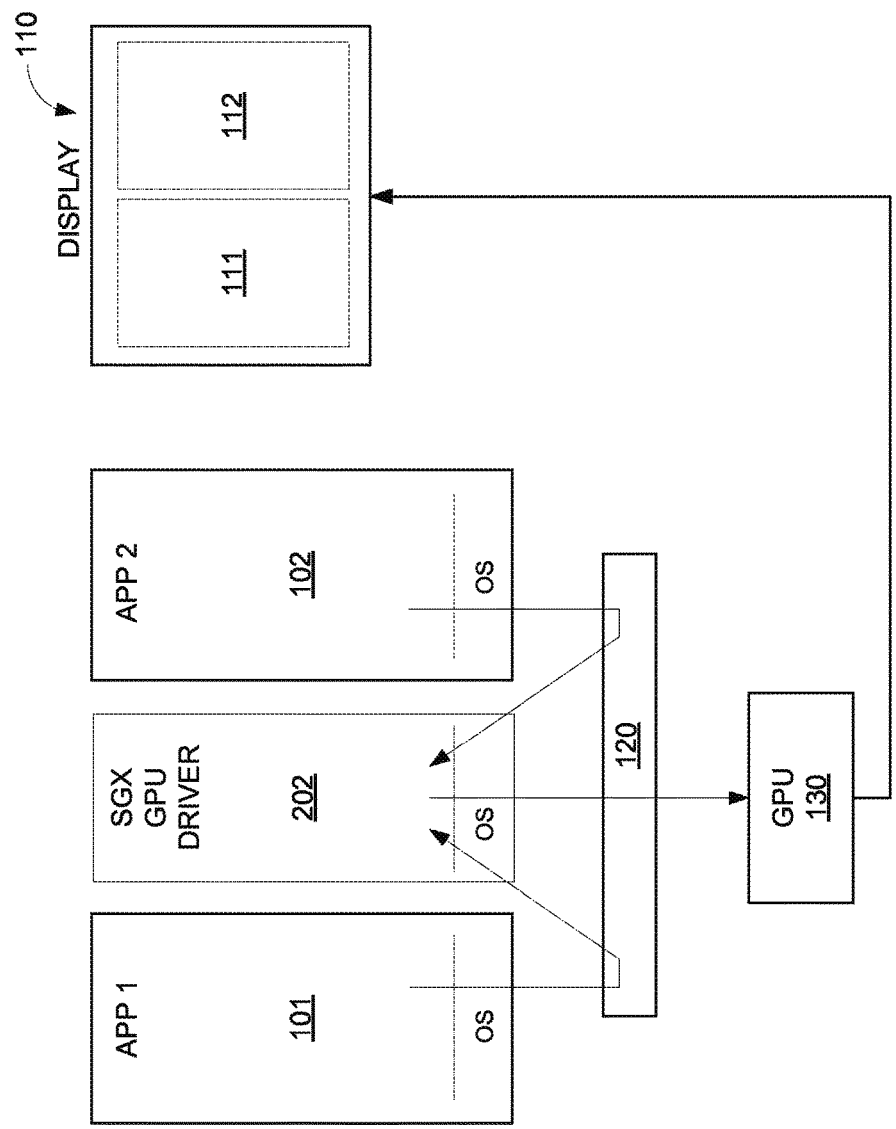
FIG. 2 is a simplified, functional block diagram of a GPU sharing system in accordance with another embodiment.

Briefly, FIG. 1 is a simplified, functional block diagram of an example GPU sharing system, while FIG. 2 is a simplified, functional block diagram of a GPU sharing system in accordance with another embodiment. Referring to FIG. 1, two applications (101 and 102) running on corresponding operating systems communicate through hypervisor 120 to a shared GPU 130. GPU 130 then communicates with display 110 to render two different regions (111 and 112) of the display, corresponding respectively to applications 101 and 102. Referring to the system illustrated in FIG. 2, applications 101 and 102 communicate (through hypervisor 120) to an SGX GPU driver 202, which itself communicates with GPU 130 to produce corresponding regions 111 and 112 on display 110. In this way, neither application 101 nor application 102 (or VM associated therewith) has direct access to GPU 130.

In accordance with a particular embodiment, a solution is provided for Imagination Tech's PowerVR SGX GPU on Linux, though it will be appreciated that the invention is not so limited, and may be applied in the context of a variety of graphics acceleration environments. The SGX examples illustrated herein are used without loss of generality.

In general, in the PowerVR SGX embodiment, the system intercepts the SGX specific commands that are communicated between processes and the SGX driver (in the Linux kernel) through a user/kernel system-call API. The intercepted commands are communicated between a client VM and the server VM using, for example, the GD Connect™ communication framework provided by General Dynamics. The invention is not so limited, however, and may employ a variety of type-1 and type-2 hypervisors.

A modified version of the SGX driver is provided on the server and is coupled to a GD Connect SGX server, which supports concurrent connection of multiple independent client VMs. Each client VM contains a proxy driver which implements the SGX user/kernel API and proxies this interface to the server. Providing the split at the kernel/user API level allows proprietary GPU vendor specific libraries (such as the OpenGL library) which run within an application's process, to be used unmodified and unaware of the virtualization being present.

The described technique allows for improved performance of GPU virtualization as compared to high-level API virtualization, since many individual high-level APIs are often translated into a single request in the GPU specific command set. Because of this, there can be considerably fewer messages sent between the client and server for the same overall effect.

This technique also has a benefit in that the virtualization is not specific to any particular high-level language. Indeed, each GPU vendor provides implementations of multiple high level languages (e.g. OpenGL1.1, OpenGLES2.0, OpenVG, etc.), all of which translate to a common vendor specific GPU language. The disclosed virtualization technique and its implementation is GPU vendor-specific and provides virtualization of multiple high level APIs automatically.

Figure 3:
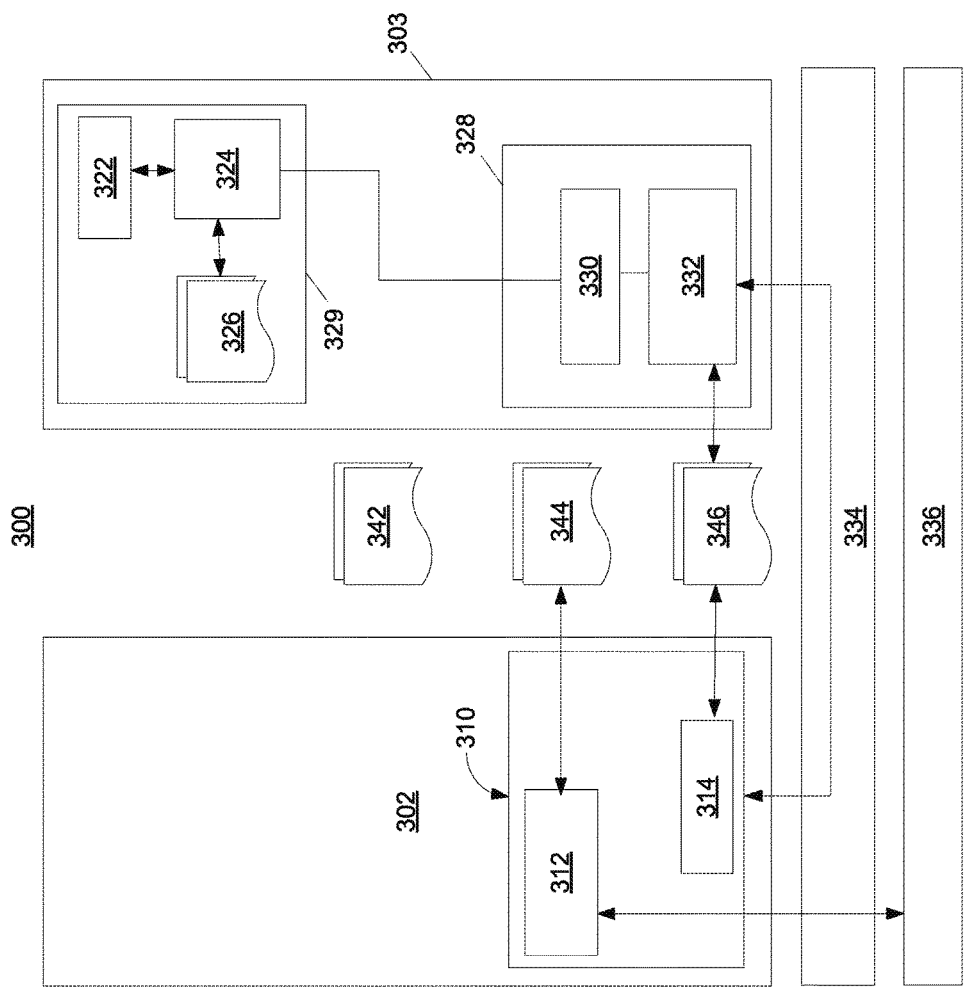
FIG. 3 is a block diagram depicting a GPU sharing system in accordance with an example embodiment.

Referring now to FIG. 3, in one embodiment, the disclosed methods have been implemented for a type-1 hypervisor-based (e.g., OKL4 Microvisor-based) smartphone architecture 300 running two VMs 302 and 303. VM 302 acts as the Driver VM and VM 303 acts as the Client VM. The Client VM 303 has no direct access to the GPU hardware 336. In various embodiments there may be multiple independent Client VMs, each of which may have identical or different components.

Client VM 303 contains OK:Linux kernel 328 and OK:Android user-land stack 329. OK:Linux kernal 328 includes a dummy driver (e.g., SGX driver) 330 and a virtual service client 332. OK:Android user-land stack 329 includes a compositor 322, a graphics HAL 324, and one or more graphics applications 326. The Driver VM 302 contains an OK:Linux component 310, which in turn includes a driver (e.g., SGX driver) 312 and a virtual service server 314.

In the case of two Android Client VMs, for example, both VMs will contain a dummy SGX driver, a virtual service client, a compositor, a graphics HAL, and one or more graphical applications, as shown. The Client VMs will therefore communicate with the Driver VM 302 but will not communicate with each other (i.e., from a graphics virtualization point of view).

Virtual service client 332 and virtual service server 314 are coupled to an argument-shared buffers block (i.e., one shared buffer per Client VM) 346, as illustrated. In this embodiment, the client-server communication takes place using the GD Connect Stack, which is a network-like stack specialized for device sharing between guests in a virtualized system. As shown, system 300 also includes a hypervisor 334, a common graphics heap 344, and a per-VM virtual frame buffer 342 interconnected as shown.

In accordance with one embodiment, driver 330 within OK:Linux kernal 328 of Client VM 303 has been modified to act as a dummy driver and does not perform any hardware initializations. It interacts with the client-side GD Connect proxy driver, which forwards SGX commands and responses over a communication channel and shared memory (e.g., 346) to the SGX driver VM 302. The client-side proxy driver also handles mapping of buffers and allocations into client-end user space. The virtual services server 314 in VM 302 receives commands from the clients and injects them into the modified native SGX driver 312. The server 314 and client proxy driver 332 are also responsible for performing pointer translations and argument marshalling. Server 314 performs process-id virtualization by allocating virtual process-ids for relevant processes in the remote clients. This allows the system to take advantage of the per-process isolation which the SGX driver already supports and repurpose it for isolating applications belonging to different VMs.

Modifications have been performed on the server-side native SGX driver 312 to allow graphics buffers and other allocations to come out of shared memory. These allocations are accessed by the GPU 336 and are also mapped into the client-side user space. In one embodiment, the "mmap" operation has been virtualized to accomplish this. Further modifications to the native driver to support per-VM shared memory have also been implemented, providing enhanced VM isolation, (e.g. not just application level isolation). Command completion (e.g., a 2D blit or a 3D render or a flip operation) by the GPU is communicated to the client VM 303 using a GD Connect notification mechanism.

Figure 4:
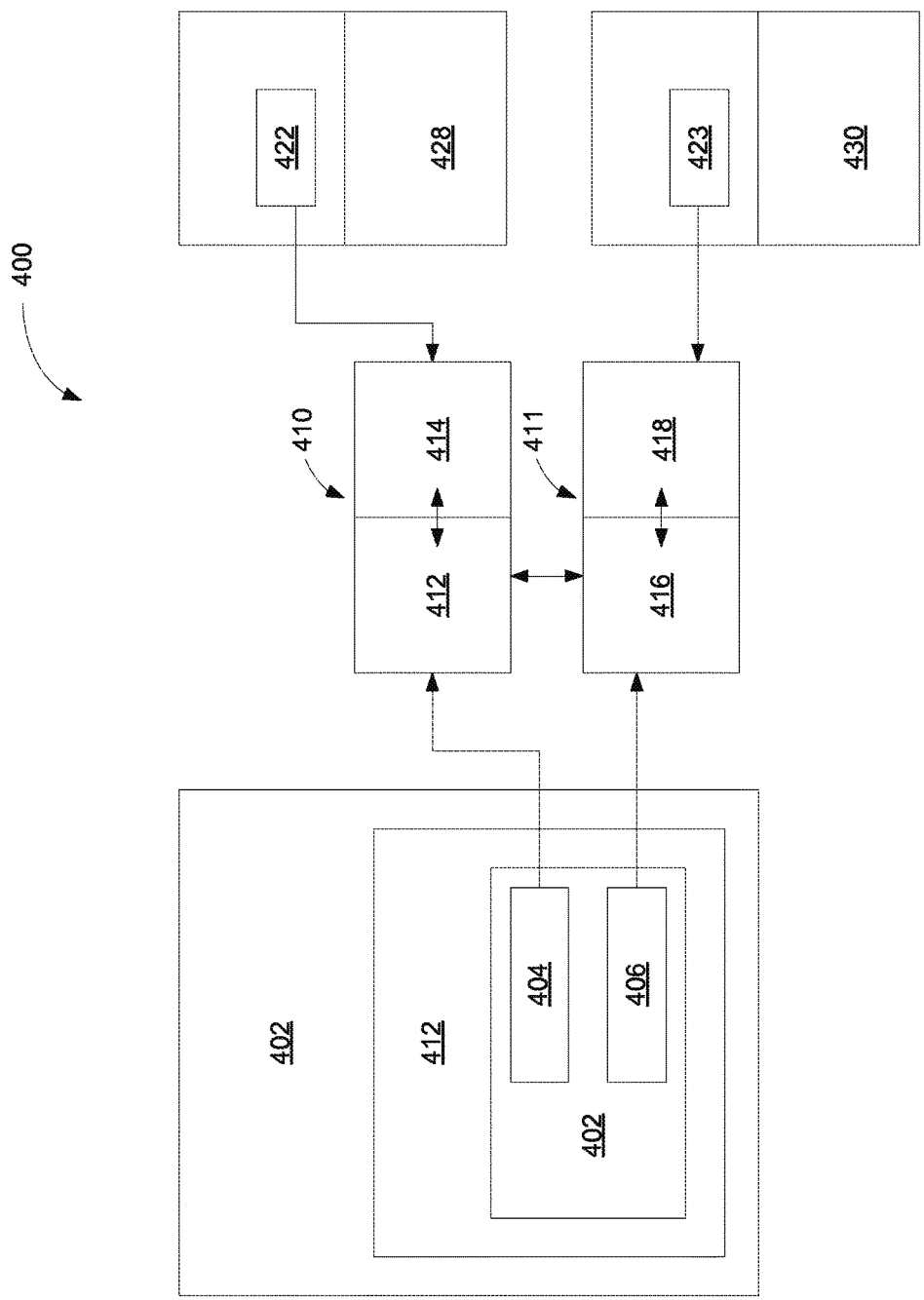
FIG. 4 is a functional block diagram depicting the interaction between a display class driver and the swap chains in accordance with one embodiment.

Referring to FIG. 4, system 400 comprises a driver VM 402 including an OS kernel (e.g., a Linux kernel) 412, a virtual display class driver 402, and swap chains 404 and 406. System 400 also includes a virtual framebuffer area (collectively, areas 410 and 411), each of which is a region of memory (general purpose or graphics memory), equal or larger than the size of the output display. Virtual frame buffer 410 (for VM 1) comprises at least two buffers 412 and 414. Any point in time, one of these buffers will be the front buffer, and the remaining will be the back buffer(s). Similarly, virtual frame buffer 411 (for VM 2) comprises at least two buffers 416 and 418, where, at any point in time, one of these buffers will be the front buffer, and the remaining will be the back buffer(s). As shown, buffer 414 is coupled to a compositor 422 associated with an OK: Linux kernel 428, and buffer 418 is coupled to a compositor 423 associated with an OK: Linux kernel 430.

Swap chains 404 and 406 each comprise a circular list of descriptors for the display-sized buffers, which are allocated from the memory 410 and 411 respectively (assuming the virtual framebuffer area is large enough for two or more whole display windows). The swap chains 404 and 406 are used to implement double, triple or larger orders of buffering. With the actual display hardware configured to output the display window pointed to by the list-tail, the graphics engine renders into the list-head display window. On completion of rendering, the list head increments to the next available window (without allowing the head to reach the tail). The tail pointer may be updated synchronously with this event, or its advancement could be delayed (e.g., until the end the current display refresh).

The use of swap chains as shown prevents display artifacts that would be visible due to (a) rendering to the same memory that the display hardware is outputting, i.e., the display may refresh in the middle of a render, leading to flickering or artifacts on the display; (b) non-synchronized switching of the active display window, causing "tearing" in which the display exhibits an effect where part of the display shows the old frame(s) and the other part shows the new frame.

In particular, swap chains 404 and 406 are typically used in two ways. First, the application in control of the display hardware (e.g. 322) uses the swap chains to switch from one frame to the next—without display artifacts. In a desktop environment, applications typically only have control over their own windows, not the whole display. The OS compositor typically controls the display as described above. Applications still use double buffering and buffer swapping, which works like swap-chains; however this is usually through a high level API—such as EGL (the API to link OpenGL to the native windowing system). The buffer-swap command is sent to the compositor (e.g., 422, a window manager) once an output window is fully rendered, and the compositor 422 then knows it is safe to use that buffer to render to an actual output virtual framebuffer (which may have windows from multiple applications) which will likely be the head buffer in one of the VM's swap chains. Note, in the above discussion only two levels of rendering are discussed: an application and a compositor (window manager), however the present invention is not limited to a particular number of levels. A compositor may, for example, use EGL to render to a window of yet another compositor.

In accordance with the subject matter described herein, systems generally have a virtual-framebuffer protocol (with associated shared memory) between the Driver VM (Server) and the Client VM. Each client VM has its own virtual-framebuffer area (which the client may use as multiple display windows) which is shared memory between the client and server. A client can use a virtual-framebuffer command such as "pan-display" to directly select which part of the virtual-framebuffer area is used as the current output display window, or use the swap-chain virtualization method.

In one embodiment, the SGX virtualization implementation uses a dedicated SGX protocol link between the client and server (which is independent of the virtual framebuffer). The server is modified to link up the SGX virtualization with the framebuffer virtualization such that when a client creates a swap-chain using SGX commands, on the server side, the swap-chain is associated and linked to the client's virtual framebuffer. Therefore, virtual SGX display output is both linked to the existing virtual framebuffer (allowing mixed use of SGX and direct drawing on the framebuffer by the client VM), and a "pan-display" function is linked to the swap-chain for that client. The "pan-display" function is an implementation-specific embodiment of the abstract swap chain, which is virtualized between the client/server. These techniques can be extended to multiple virtual framebuffers between a client-server pair.

To the client, the virtual framebuffer appears to be a native display, and the client can use native code written directly to the framebuffer API, including native SGX libraries which link SGX to the display. On the server side, the virtual framebuffers may be linked to a physical display (or not) in a variety of ways, including, for example, a world-switch, in which the server associates one client's virtual-framebuffer with a physical display, and from time-to-time may switch which client's virtual framebuffer is associated with it. In another embodiment, the virtual-framebuffers are exposed to a compositor application (on the server VM), that can choose to combine the multiple client virtual-framebuffers to the physical display as it chooses (including using the GPU itself to accelerate this).

Figure 5:
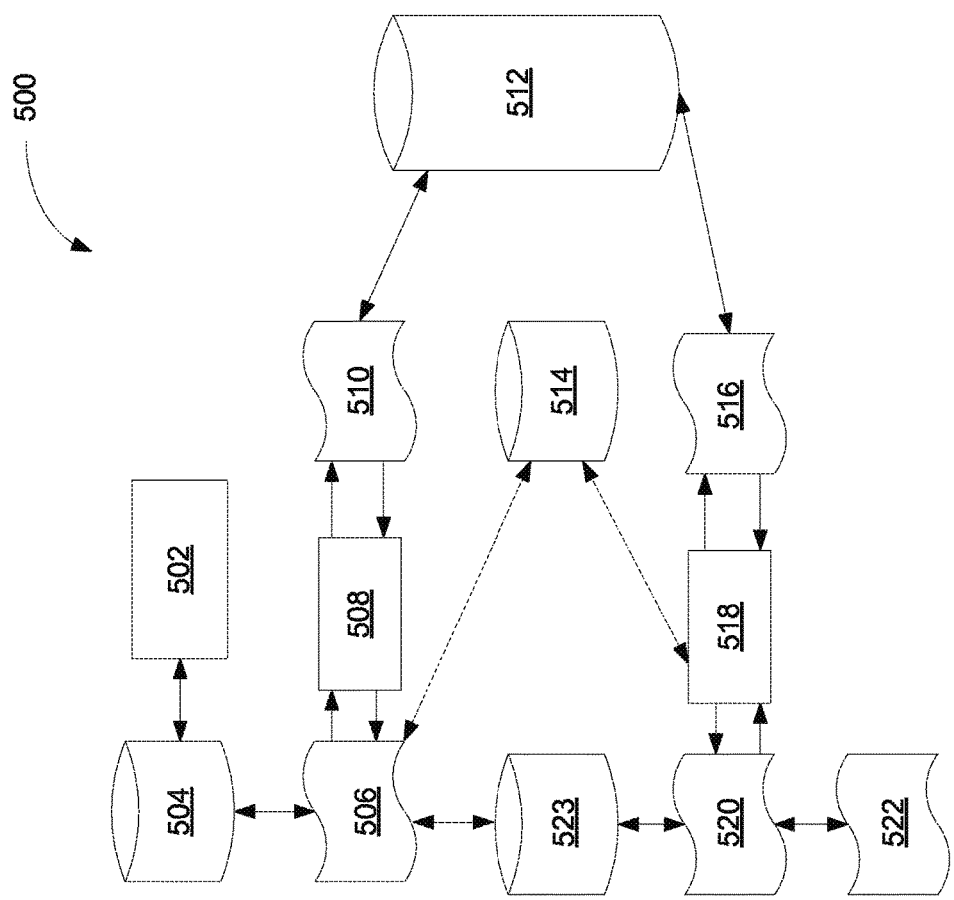
FIG. 5 is a virtual SGX flow diagram in accordance with one embodiment.

FIG. 5 illustrates a flow diagram 500 showing how an SGX-specific graphics command is virtualized in accordance with one embodiment. Specifically, flow diagram 500 includes graphics applications 502 (e.g., Linux graphics applications) communicating (e.g., via an ioctl system call) with virtual device 504. Virtual device 504 is provided by dummy SGX driver 506, which itself is coupled to vSGX client driver 508 as well as argument shared buffer 514. vSGX driver 508 communicates through GD Connect™ subsystem 510 with Microvisor specific GD Connect transport device 512.

Transport device 512 communicates with GD Connect subsystem 516, which in turn communicates with vSGX server driver 518. An SGX driver 520 coupled to heap shared buffer 523 communicates with vSGX server driver 518 as shown. Shared heap buffer 523 is also coupled to dummy SGX driver 506 and (therefore virtual device 504). Finally, SGX driver 520 communicates with virtual display class driver 522 via, for example, swap chain creation and flip operations.

Figure 6:
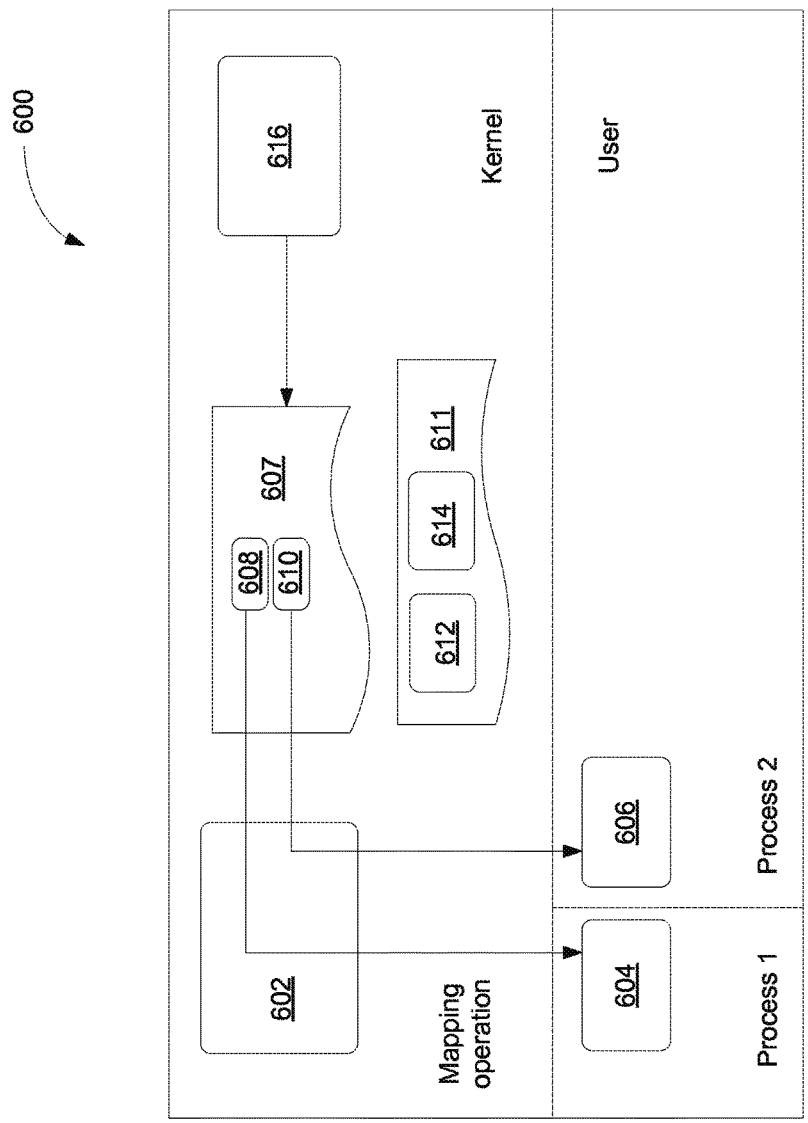
FIG. 6 is a functional block diagram depicting virtualization of graphics allocations and mmap operations in accordance with one embodiment.

FIG. 6 presents a functional block diagram 600 depicting virtualization of graphics allocations and mmap operations in accordance with one embodiment. As shown, the system at the kernel level includes a and GD Connect SGX client 616 (which should have a link out to a server VM) providing (via proxy) graphics buffer allocations from a heap shared buffer 607 (shared with the Driver VM) which handles, as illustrated, an allocation 608 and an allocation 610. Allocation 608 proceeds through dummy SGX driver 602 to graphics allocation 604 within a first process (process 1), while allocation 610 proceeds through dummy SGX driver 602 to graphics allocation 606 within a second process (process 2), both within user space.

It will be appreciated that the systems and methods described herein address a number of issues associated with prior art virtualization techniques. For example, the described techniques allow a virtual machine without any direct access to graphics hardware to perform hardware accelerated 2D/3D graphics with high performance. The described techniques also provide multiple VMs with concurrent access to the GPU hardware and allows the creation of more secure systems by isolating the graphics device into a separate VM.

Furthermore, virtualizing the graphics stack at a lower level provides better performance and buffer management, and this high performance virtualization allows for more efficient use of the computing power and may find use in many cost-sensitive designs. Many high level graphics APIs e.g., OpenGLES2.0, OpenGL1.1, OpenVG etc. may be virtualized at a low cost. The virtualization can also support simultaneous display of 3D content from multiple virtual machines to a single shared graphical output device, or multiple separate graphical output devices. This virtualization technique allows the system to take advantage of the built-in security features of the graphics driver, e.g., buffer isolation, process level security, and the like.

Virtualizing at a kernel/user API level (or similarly low level) does not require any modifications to the proprietary user-land graphics stack, thus making this solution very cost effective both in terms of development (avoiding a significant license fee) and in terms of IP protection.

Embodiments of the invention may be implemented in a variety of contexts. For example, any mobile platform requiring enhanced security or multiple personas will potentially require GPU virtualization. Dual persona phones (with Personal and Enterprise domains) that run multiple Android instances in separate Virtual Machines, may utilize the disclosed virtualization technique to allow both Android instances take full advantage of graphics hardware acceleration. This enhances the overall UI performance as well as provides the ability to run 3D games and applications from the Android instances with no direct access to the graphics hardware. The availability of GPU virtualization is essential for the commercial adoption of dual persona phones.

Government (or other high-security) single persona phones may also employ the disclosed techniques. While high-security devices may not require multiple OSs, the use of isolation of device drivers and isolated policy and control components is highly desirable. Separating GPU drivers from the OS provides additional layers of defense against software attacks on the system, such as a compromised OS (such as Android) or network driver. A compromised driver, especially one dealing with bus-mastering or DMA devices is a significant threat, since it can be used to bypass other software isolation provided by a Hypervisor. Thus, the embodied GPU virtualization can find use in modern government and military applications.

The disclosed techniques may also be used in connection with medical device integration. As with government and military use cases, medical device manufactures are looking to integrate medical functionality into smartphone devices. There exists a desire to enhance medical equipment with modern (e.g. Android) user interfaces while maintaining the real-time, security and robustness properties of the medical software stacks. Medical applications require isolation from the general purpose application environments and more and more rely on GPU acceleration.

The disclosed techniques may also be used in connection with gaming consoles such as the Xbox 360 or Sony Playstation to isolate 3D games into a separate Virtual Machine from the Gaming Console OS and or firmware.

The disclosed techniques may be used in connection with the automotive domain for isolating graphics applications running on high-level OS such as Android, from proprietary automotive software like mapping, heads-up display, safety features (rearview camera), etc., running in a separate OS or RTOS, outputting to a single display or displays. This enhances the user experience by allowing the use of familiar operating systems—as well as providing flexibility and richer user experience by providing downloadable applications, app stores etc., without compromising core functionality with regulatory requirements to uphold.

The disclosed techniques may be implemented as any combination of software and/or hardware, as is known in the art. For example, the methods described above may be implemented through the use of non-transitory computer-readable media bearing software instructions configured to instruct a processor to perform the steps described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure and the legal equivalents thereof.

The invention claimed is:

1. A method of sharing access to graphics processing unit (GPU) hardware between a plurality of client virtual machines, wherein each of the client virtual machines has a high-level application programming interface (API) associated therewith for communicating with the GPU hardware, the method comprising:
   virtualizing the GPU by intercepting GPU-specific commands from the plurality of client virtual machines, wherein the GPU-specific commands are at a lower level than that of the high-level API and wherein translation of the GPU-specific commands occurs separately from a GPU driver that directly communicates with the GPU hardware; and
   providing the intercepted commands to the GPU hardware.

2. The method of claim 1, wherein the GPU-specific commands are at a user-kernel application programming interface (API) level.

3. The method of claim 1, wherein the high-level API commands are translated to the GPU-specific commands separate from a GPU driver communicating with the GPU hardware.

4. The method of claim 1, wherein the intercepted commands are communicated to a server virtual machine configured to support concurrent connections with the plurality of client virtual machines.

5. A graphics processing unit (GPU) virtualization system comprising:
   graphics processing unit (GPU) hardware;

a first client virtual machine and a second client virtual machine, wherein each of the client virtual machines has a high-level application programming interface (API) associated therewith for communicating with the GPU hardware; and a virtualization module for virtualizing the GPU by intercepting GPU-specific commands from the first and second client virtual machines, wherein the GPU-specific commands are at a lower level than that of the high-level API and wherein translation of the GPU-specific commands occurs separately from a GPU driver that directly communicates with the GPU hardware.

6. The system of claim 5, wherein the GPU-specific commands are at a user-kernel application programming interface (API) level.

7. The system of claim 5, wherein the high-level API commands are translated to the GPU-specific commands separate from a GPU driver communicating with the GPU hardware.

8. The system of claim 5, further including a server virtual machine configured to support concurrent connections with the first and second client virtual machines and receive the intercepted commands therefrom.

9. The system of claim 8, further including a shared memory region for GPU-related allocations communicatively coupled between the server virtual machine and the first client virtual machine.

10. The system of claim 9, further including an argument-shared-buffer residing within the shared memory region.

11. The system of claim 9, further including a graphics heap residing within the shared memory region.

12. The system of claim 5, further including a swap chain linked to a virtual framebuffer associated with the first client virtual machine.

13. Non-transitory computer-readable media bearing software instructions configured to instruct a processor to share access to graphics processing unit (GPU) hardware between a plurality of client virtual machines, wherein each of the client virtual machines has a high-level application programming interface (API) associated therewith for communicating with the GPU hardware by performing the steps of:

virtualizing the GPU by intercepting GPU-specific commands from the plurality of client virtual machines, wherein the GPU-specific commands are at a lower level than that of the high-level API and wherein translation of the GPU-specific commands occurs separately from a GPU driver that directly communicates with the GPU hardware; and providing the intercepted commands to the GPU hardware.

14. The non-transitory computer-readable media of claim 13, wherein the GPU-specific commands are at a user-kernel application programming interface (API) level.

15. The non-transitory computer-readable media of claim 13, wherein the high-level API commands are translated to the GPU-specific commands separate from a GPU driver communicating with the GPU hardware.

16. The non-transitory computer-readable media of claim 13, wherein the intercepted commands are communicated to a server virtual machine configured to support concurrent connections with the plurality of client virtual machines.

17. The non-transitory computer-readable media of claim 13, further including linking a swap chain to a plurality of virtual framebuffers respectively associated with the plurality of client virtual machines.

* * * * *